United States Patent
Yumer

(10) Patent No.: US 9,800,606 B1
(45) Date of Patent: Oct. 24, 2017

(54) SYSTEMS AND METHODS FOR EVALUATING NETWORK SECURITY

(71) Applicant: Symantec Corporation, Mountain View, CA (US)

(72) Inventor: Leylya Yumer, Antibes (FR)

(73) Assignee: Symantec Corporation, Mountain View, CA (US)

( * ) Notice: Subject to any disclaimer, the term of this patent is extended or adjusted under 35 U.S.C. 154(b) by 57 days.

(21) Appl. No.: 14/952,410

(22) Filed: Nov. 25, 2015

(51) Int. Cl.
*H04L 29/06* (2006.01)
*H04L 29/08* (2006.01)
*G06F 21/55* (2013.01)

(52) U.S. Cl.
CPC ........ *H04L 63/1433* (2013.01); *G06F 21/552* (2013.01); *H04L 63/1408* (2013.01); *H04L 63/1416* (2013.01); *H04L 63/1425* (2013.01); *H04L 67/06* (2013.01)

(58) Field of Classification Search
CPC ............. H04L 63/1433; H04L 63/1408; H04L 63/1416; H04L 63/1425; G06F 21/552
See application file for complete search history.

(56) References Cited

U.S. PATENT DOCUMENTS

| | | | | |
|---|---|---|---|---|
| 8,108,923 B1* | 1/2012 | Satish | .................. | G06F 21/552 713/166 |
| 8,272,061 B1* | 9/2012 | Lotem | .................. | G06F 21/577 709/223 |
| 8,291,495 B1* | 10/2012 | Burns | .................. | H04L 63/0254 455/410 |
| 8,484,730 B1* | 7/2013 | P. R. | .................... | G06F 11/3438 709/225 |
| 8,555,388 B1* | 10/2013 | Wang | .................. | H04L 63/1416 709/245 |
| 8,561,180 B1* | 10/2013 | Nachenberg | .......... | G06F 21/562 726/22 |
| 8,712,596 B2* | 4/2014 | Scott | ....................... | G06F 21/55 700/297 |

(Continued)

OTHER PUBLICATIONS

TCG Software Stack (TSS) Specification Version 1.2 Level 1 Part1: Commands and Structures; Jan. 6, 2006; 2006 Trusted Computing Group, Incorporated.*

(Continued)

*Primary Examiner* — James Turchen
(74) *Attorney, Agent, or Firm* — FisherBroyles, LLP

(57) ABSTRACT

A computer-implemented method for evaluating network security may include (1) receiving, by a security server, a request to report a network risk score for an organization based on telemetry data describing file downloads at computers managed by the organization over a specified period of time, (2) identifying the telemetry data describing file downloads at the computers managed by the organization over the specified period of time, (3) searching the telemetry data to match file downloads over the specified period of time to at least one file that was previously categorized, prior to the request, as a hacking tool, (4) calculating the network risk score based on the telemetry data, and (5) reporting, automatically by the security server in response to the request, the calculated network risk score. Various other methods, systems, and computer-readable media are also disclosed.

20 Claims, 6 Drawing Sheets

(56) References Cited

U.S. PATENT DOCUMENTS

| | | | | |
|---|---|---|---|---|
| 8,752,172 | B1* | 6/2014 | Dotan | H04L 63/1483 709/206 |
| 8,819,829 | B1* | 8/2014 | Martini | H04L 67/303 726/24 |
| 8,959,568 | B2* | 2/2015 | Hudis | G06F 21/552 726/1 |
| 9,396,332 | B2* | 7/2016 | Abrams | G06F 21/554 |
| 9,438,626 | B1* | 9/2016 | Zilberberg | H04L 63/20 |
| 2003/0188190 | A1* | 10/2003 | Aaron | H04L 63/1408 726/23 |
| 2005/0102534 | A1* | 5/2005 | Wong | G06F 21/577 726/4 |
| 2005/0262556 | A1* | 11/2005 | Waisman | H04L 63/0236 726/22 |
| 2007/0085710 | A1* | 4/2007 | Bousquet | G06F 17/30539 341/50 |
| 2007/0094491 | A1* | 4/2007 | Teo | H04L 63/1408 713/153 |
| 2007/0139231 | A1* | 6/2007 | Wallia | H04L 63/1408 341/50 |
| 2008/0022384 | A1* | 1/2008 | Yee | H04L 63/0263 726/11 |
| 2008/0027891 | A1* | 1/2008 | Repasi | G06F 21/55 706/52 |
| 2009/0138573 | A1* | 5/2009 | Campbell | G06F 21/554 709/218 |
| 2010/0125911 | A1* | 5/2010 | Bhaskaran | G06Q 10/10 726/23 |
| 2012/0030731 | A1* | 2/2012 | Bhargava | G06F 21/54 726/3 |
| 2012/0030750 | A1* | 2/2012 | Bhargava | H04L 63/02 726/13 |
| 2012/0046989 | A1* | 2/2012 | Baikalov | G06Q 10/0635 705/7.28 |
| 2012/0143650 | A1* | 6/2012 | Crowley | G06F 21/554 705/7.28 |
| 2013/0276114 | A1* | 10/2013 | Friedrichs | G06F 21/56 726/23 |
| 2013/0318236 | A1* | 11/2013 | Coates | H04L 43/045 709/224 |
| 2014/0130157 | A1* | 5/2014 | Sallam | G06F 21/552 726/23 |
| 2014/0208425 | A1* | 7/2014 | Palomaki | G06F 21/56 726/23 |
| 2016/0065594 | A1* | 3/2016 | Srivastava | H04L 63/1408 726/23 |
| 2016/0078247 | A1* | 3/2016 | Tucker | G06F 21/6218 726/1 |

OTHER PUBLICATIONS

Taking Account of Privacy when Designing Cloud Computing Services; HP Laboratories; Siani Pearson; Mar. 6, 2009.*

* cited by examiner

SYSTEMS AND METHODS FOR EVALUATING NETWORK SECURITY

BACKGROUND

Individuals and organizations typically implement a variety of security measures to protect their computing resources from malicious attacks. For example, enterprise organizations may install antivirus scanners at client computing devices. These antivirus scanners may automatically or periodically scan incoming and outgoing files for the presence of computer viruses. Similarly, enterprise organizations may also install firewall applications on client computing devices. The firewall applications may block network traffic on one or more ports in accordance with predefined security policies.

Similarly, computer hackers who attack enterprise organizations may use a variety of tools and programs. Some of these tools may be created and designed specifically for the purpose of compromising computer security. For example, password crackers have the explicit purpose of cracking and undermining password security. Computer hackers may also use other system, administrator, network, and/or auditing tools that do not have the sole purpose of undermining computer security, but which nevertheless provide the hackers with powerful functionality that may assist the hackers in performing an attack. Recently, computer hackers have successfully compromised the security at several major enterprise organizations using one or more of these hacking tools. Accordingly, the instant disclosure identifies and addresses a need for additional and improved systems and methods for evaluating network security.

SUMMARY

As will be described in greater detail below, the instant disclosure generally relates to systems and methods for evaluating network security by, for example, calculating and reporting a network risk score for an organization that indicates an amount and/or proportion of hacking tools (e.g., installations, executions, downloads, machines downloading, etc.) over a period of time. In one example, a computer-implemented method for evaluating network security may include (1) receiving, by a security server, a request to report a network risk score for an organization based on telemetry data describing file downloads at computers managed by the organization over a specified period of time, (2) identifying the telemetry data describing file downloads at the computers managed by the organization over the specified period of time, (3) searching the telemetry data to match file downloads over the specified period of time to at least one file that was previously categorized, prior to the request, as a hacking tool, (4) calculating the network risk score based on the telemetry data, the network risk score being proportional to a count of file downloads at the computers over the specified period of time that match the file previously categorized as the hacking tool, and (5) reporting, automatically by the security server in response to the request, the calculated network risk score that is proportional to the count of file downloads over the specified period of time that match the file previously categorized as the hacking tool.

In one embodiment, the security server categorized the file as the hacking tool at least in part by creating a comprehensive list of hacking tools identified within a data set and identifying the file on the comprehensive list of hacking tools. In one embodiment, the security server categorized the file as the hacking tool at least in part by categorizing the file as (1) a system diagnosis tool, (2) a security auditing tool, (3) a network port scanner, (4) a network sniffer, (5) a forensics tool, (6) a pass-the-hash attack tool, (7) a password cracker, (8) a remote access tool, (9) a file sharing tool, (10) a hijacking tool, (11) an exploitation tool, and/or (12) a man in the middle attack tool.

In one embodiment, the security server categorized the file as the hacking tool at least in part by categorizing the file into one of multiple predefined categories. Each of the predefined categories may indicate an increasing level of security threat. In one embodiment, the predefined categories include: (1) a high risk category indicating a tool that is designed for performing hacking attacks, (2) a medium risk category indicating a tool that is useful for performing hacking attacks but is not designed for performing hacking attacks, and (3) a low risk category indicating a system diagnosis tool.

In some examples, searching the telemetry data to match file downloads may include searching a comprehensive database that stores telemetry data for enterprise clients of a security vendor. In some examples, searching the comprehensive database may include searching a table using at least one of the following as a database key: (1) an enterprise identifier, (2) a computing machine identifier, (3) a file hash, (4) a file name, and/or (5) a file directory. In some examples, searching the comprehensive database may include creating a sub-table from the table by removing downloads for files other than hacking tools.

In one embodiment, the enterprise identifier is anonymized and searching the comprehensive database may include matching the anonymized enterprise identifier to the organization. In one embodiment, calculating the network risk score based on the telemetry data may include calculating a sum of sub-scores. Each sub-score may indicate a product of a risk score for a distinct hacking tool and a count of computers in the computers that downloaded the distinct hacking tool over the specified period of time.

In one embodiment, a system for implementing the above-described method may include (1) a reception module, stored in memory, that receives, as part of a security server, a request to report a network risk score for an organization based on telemetry data describing file downloads at computers managed by the organization over a specified period of time, (2) an identification module, stored in memory, that identifies the telemetry data describing file downloads at the computers managed by the organization over the specified period of time, (3) a searching module, stored in memory, that searches the telemetry data to match file downloads over the specified period of time to at least one file that was previously categorized, prior to the request, as a hacking tool, (4) a calculation module, stored in memory, that calculates the network risk score based on the telemetry data, the network risk score being proportional to a count of file downloads at the computers over the specified period of time that match the file previously categorized as the hacking tool, (5) a reporting module, stored in memory, that reports, automatically as part of the security server in response to the request, the calculated network risk score that is proportional to the count of file downloads over the specified period of time that match the file previously categorized as the hacking tool, and (6) at least one physical processor configured to execute the reception module, the identification module, the searching module, the calculation module, and the reporting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, by a security server, a request to report a network risk score for an organization based on telemetry data describing file downloads at computers managed by the organization over a specified period of time, (2) identify the telemetry data describing file downloads at the computers managed by the organization over the specified period of time, (3) search the telemetry data to match file downloads over the specified period of time to at least one file that was previously categorized, prior to the request, as a hacking tool, (4) calculate the network risk score based on the telemetry data, the network risk score being proportional to a count of file downloads at the computers over the specified period of time that match the file previously categorized as the hacking tool, and (5) report, automatically by the security server in response to the request, the calculated network risk score that is proportional to the count of file downloads over the specified period of time that match the file previously categorized as the hacking tool.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
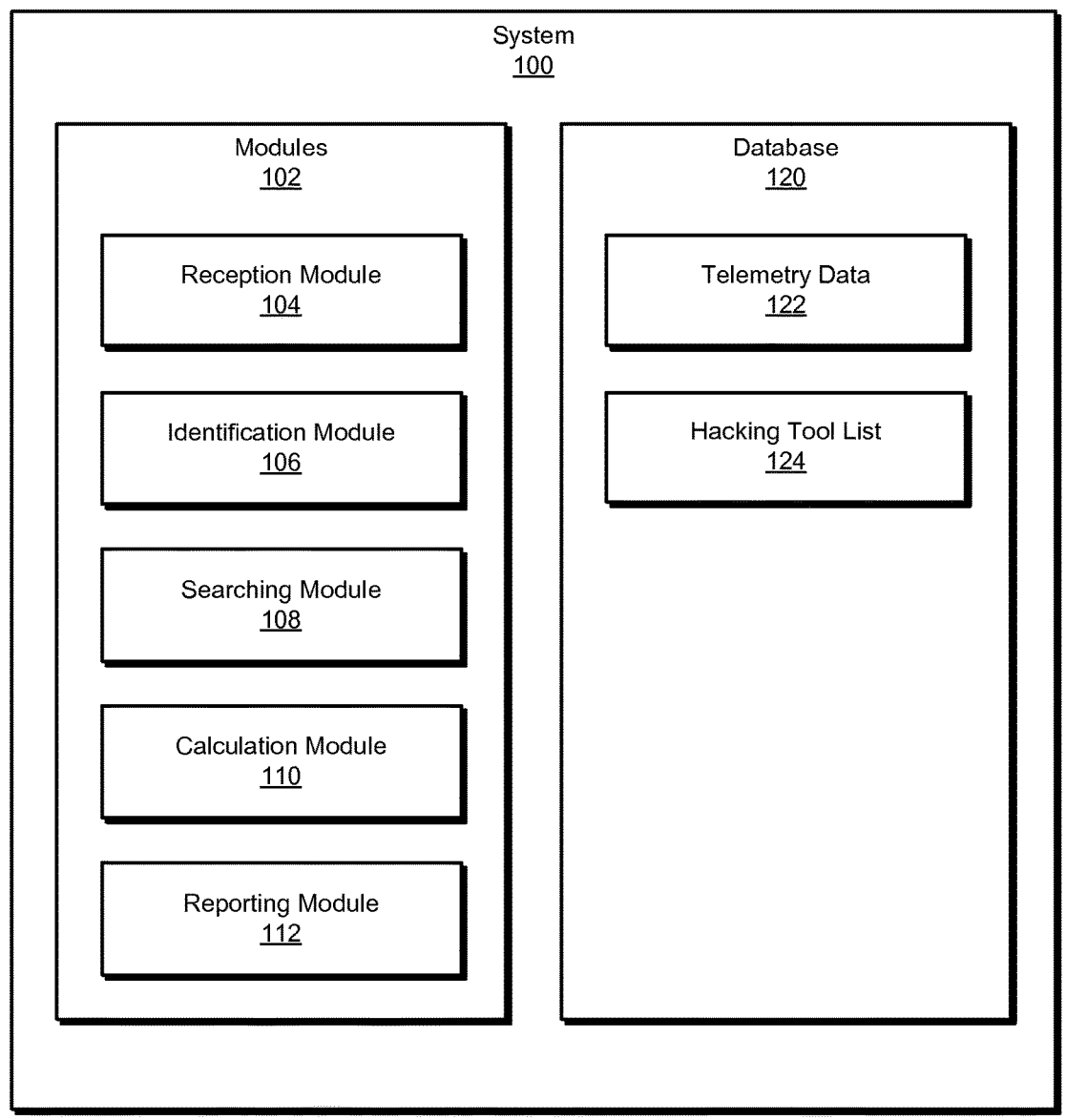
FIG. 1 is a block diagram of an exemplary system for evaluating network security.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for evaluating network security. As will be explained in greater detail below, the disclosed systems and methods may provide enterprise organizations with additional insights on potential network security risks and vulnerabilities. Specifically, the disclosed systems and methods may provide enterprise organizations with insights about hacker tool activity on computing machines owned or managed by the enterprise organizations, as discussed below. Accordingly, enterprise organizations may benefit from an improved understanding of which computing machines and/or how many computing machines have installed, downloaded, accessed, executed, and/or otherwise interacted with hacking tools over a specified period of time.

Figure 2:
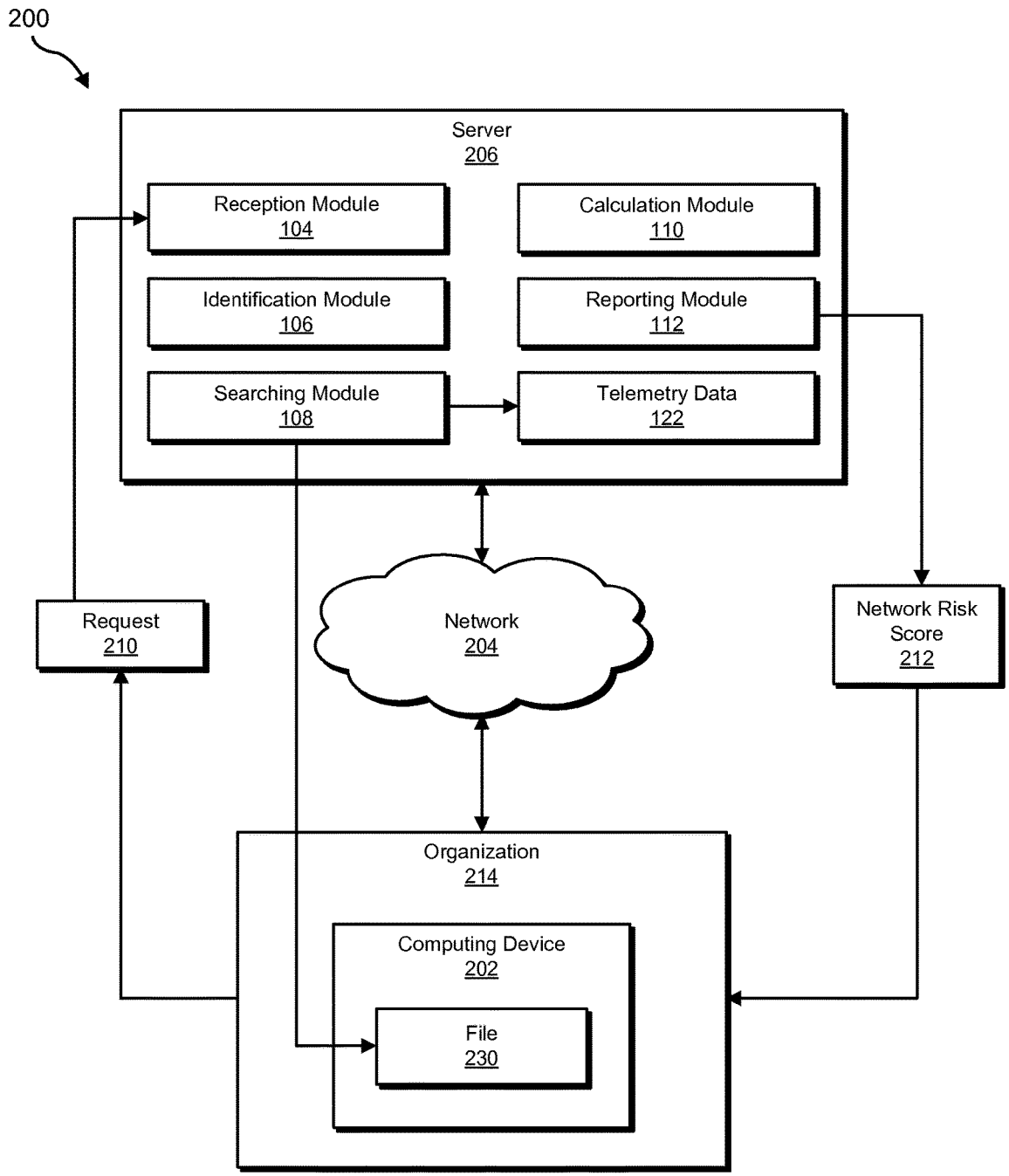
FIG. 2 is a block diagram of an additional exemplary system for evaluating network security.

The following will provide, with reference to FIGS. 1-2, detailed descriptions of exemplary systems for evaluating network security. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for evaluating network security. As illustrated in this figure, exemplary system 100 may include one or more modules 102 for performing one or more tasks. For example, and as will be explained in greater detail below, exemplary system 100 may also include a reception module 104 that may receive, as part of a security server, a request to report a network risk score for an organization based on telemetry data describing file downloads at computers managed by the organization over a specified period of time. Exemplary system 100 may additionally include an identification module 106 that may identify the telemetry data describing file downloads at the computers managed by the organization over the specified period of time.

Exemplary system 100 may also include a searching module 108 that may search the telemetry data to match file downloads over the specified period of time to a file that was previously categorized, prior to the request, as a hacking tool. Exemplary system 100 may additionally include a calculation module 110 that may calculate the network risk score based on the telemetry data. The network risk score may be proportional to a count of file downloads at the computers over the specified period of time that match the file previously categorized as the hacking tool. Exemplary system 100 may also include a reporting module 112 that may report, automatically as part of the security server in response to the request, the calculated network risk score that is proportional to the count of file downloads over the specified period of time that match the file previously categorized as the hacking tool. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store telemetry data 122, which may correspond to data collected by a security server from multiple client devices of customers of a security vendor (e.g., using an installed client-side antivirus agent). Telemetry data 122 may indicate information and metadata about files downloaded, installed, executed, accessed, and/or otherwise manipulated at the client devices over one or more periods of time. Database 120 may also be configured to store a hacking tool list 124, which may indicate a comprehensive list of hacking tools identified within one or more data sets, as discussed further below. Hacking tool list 124 may indicate one or more items of information for each hacking tool, such as an identifier, risk score, hacking tool category, filename, file directory, and/or file hash.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be managed by an organization, such as an enterprise organization, as one of multiple computing devices that the organization owns and/or maintains. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to evaluate network security. For example, and as will be described in greater detail below, reception module 104 may receive, as part of server 206, a request 210 to report a network risk score 212 for an organization 214 based on telemetry data (e.g., telemetry data 122) describing file downloads at computers managed by organization 214 over a specified period of time. Identification module 106 may identify the telemetry data describing file downloads at the computers managed by organization 214 over the specified period of time. Searching module 108 may search the telemetry data to match file downloads over the specified period of time to a file 230 that was previously categorized, prior to request 210, as a hacking tool. Calculation module 110 may calculate network risk score 212 based on the telemetry data. Network risk score 212 may be proportional to a count of file downloads at the computers over the specified period of time that match file 230 previously categorized as the hacking tool. Reporting module 112 may report, automatically as part of server 206 in response to request 210, calculated network risk score 212 that is proportional to the count of file downloads over the specified period of time that match file 230 previously categorized as the hacking tool.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating the evaluation of network security. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
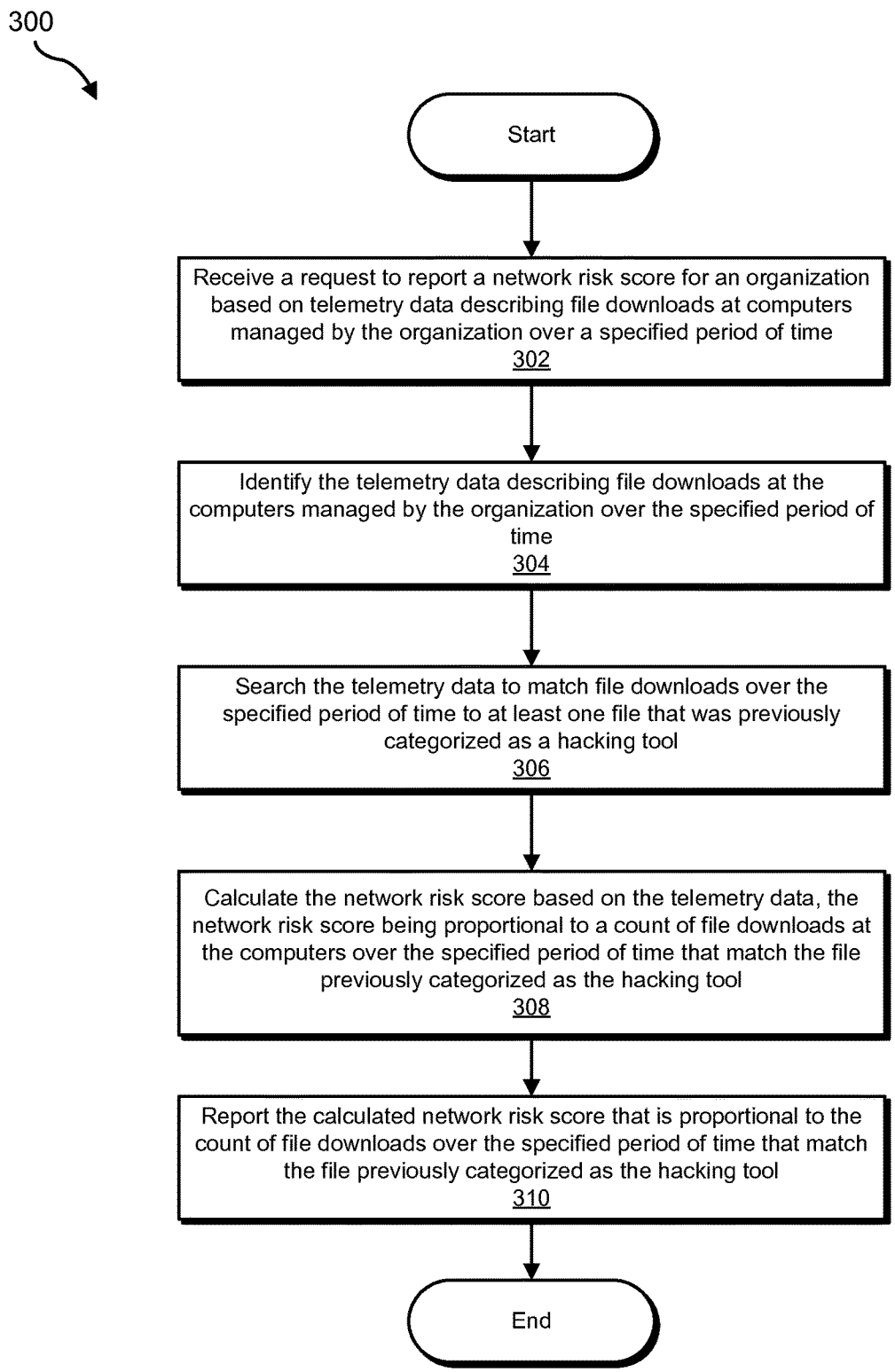
FIG. 3 is a flow diagram of an exemplary method for evaluating network security.

FIG. 3 is a flow diagram of an exemplary computer-implemented method 300 for evaluating network security. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may receive a request to report a network risk score for an organization based on telemetry data describing file downloads at computers managed by the organization over a specified period of time. For example, reception module 104 may receive, as part of server 206, request 210 to report network risk score 212 for organization 214 based on telemetry data describing file downloads at computers managed by organization 214 over a specified period of time.

As used herein, the term "network risk score" generally refers to any score or measurement that indicates a degree, amount, and/or quantification of network security or vulnerability. In some examples, the network risk score may indicate a granular score measured along a scale (e.g., a measurement along a scale from 1 to 10). In further examples, the network risk score may be displayed as a numerical value and/or be based on an underlying numerical value. Additionally, as used herein, the term "organization" generally refers to any organization, partnership, enterprise, corporation, and/or client (e.g., client of a security vendor). Furthermore, as used herein, the term "telemetry data" generally refers to data collected by a server from one or more client devices to report data describing events at the client devices. In general, the telemetry data may describe events about files or other data downloaded, installed, transmitted, accessed, executed, and/or otherwise manipulated at the client devices. The telemetry data may be collected automatically, autonomously, and/or according to a predefined schedule by one or more antivirus or intrusion prevention system software products or agents.

Reception module 104 may receive the request to report the network risk score in a variety of ways. For example, reception module 104 may receive input through one or more input devices, such as mouse, keyboard, and/or other input devices. The input may indicate the request to calculate and/or report the network risk score. Similarly, reception module 104 may receive one or more network packets from another server or client computing device on network 204. The network packets may indicate the request to calculate and/or report the network risk score. Additionally, the request may specify the period of time over which the files were downloaded. In other examples, the period of time may be predefined, implied, set at an interval, and/or set as a default rule in the absence of an override instruction. The request may also specify which computers are included within the analysis (e.g., may specify a subset of all computers owned or managed by the organization). Moreover, the request may further specify aspects or settings for reporting the network risk score, including a timing, format, configuration, display, output device, and/or level of detail for the report. Furthermore, the request may be issued manually by a human user or administrator or may be issued automatically in accordance with a predefined schedule, interval (e.g., daily, weekly, monthly, yearly, etc.), and/or other timing formula. Notably, in these examples, the timing of the request may optionally correspond to the specified period of time (e.g., monthly requests corresponding to a period of time of the last previous month).

At step 304, one or more of the systems described herein may identify the telemetry data describing file downloads at the computers managed by the organization over the specified period of time. For example, identification module 106 may, as part of server 206 in FIG. 2, identify telemetry data describing file downloads at the computers managed by organization 214 over the specified period of time.

Identification module 106 may identify the telemetry data in a variety of ways. Identification module 106 may perform step 304 after the performance of step 302 or before the performance of step 302. Identification module 106 may identify the telemetry data by identifying one or more locations (e.g., within computing memory) where the telemetry data resides. Identification module 106 may also identify the telemetry data by reading or parsing the telemetry data. Furthermore, identification module 106 may identify the telemetry data by copying, storing, and/or preserving the telemetry data (e.g., for the purpose of performing method 300).

At step 306, one or more of the systems described herein may search the telemetry data to match file downloads over the specified period of time to at least one file that was previously categorized, prior to the request, as a hacking tool. For example, searching module 108 may, as part of server 206 in FIG. 2, search the telemetry data to match file downloads over the specified period of time to file 230 that was previously categorized, prior to request 210, as a hacking tool.

As used herein, the phrase "match file downloads" generally refers to matching or identifying correspondence between one or more downloaded files and another file previously categorized as a hacking tool (e.g., previously categorized by a security server or security vendor within system 200). Similarly, the phrase "previously categorized as a hacking tool" generally refers to a categorization, indicated by specifying a value for a field within a database categorizing applications, as a hacking tool. In some examples, categorizing a file as a hacking tool may include categorizing the file as a specific subcategory or subtype of hacking tool, as discussed further below. Moreover, as used herein, the term "hacking tool" generally refers to a label or categorization assigned (e.g., by a security vendor, server, expert, and/or evaluator) to a file or application to indicate that the file or application is known to play a role (e.g., a substantial role) in performing hacking attacks (e.g., even if the application is only assigned a low threat level, as discussed further below).

Searching module 108 may search the telemetry data to match file downloads in a variety of ways. In one embodiment, searching module 108 is programmed to categorize the file as the hacking tool at least in part by creating a comprehensive list of hacking tools (e.g., hacking tool list 124) identified within a data set and identifying the file on the comprehensive list of hacking tools. The data set may include a data set collected from multiple client customers in the field by a centralized security server managed by a security vendor. Additionally, or alternatively, the data set may include one or more Internet resources, such as blogging resources, indicating the identities of hacking tools. Searching module 108 may search the data set for all files and/or applications included within the data set and then categorize some, all, or substantially all of these as either hacking tools or not hacking tools.

In one embodiment, searching module 108 is programmed to categorize the file as the hacking tool at least in part by categorizing the file as at least one of: (1) a system diagnosis tool (e.g., PING, DIG, WHOIS, RKILL, NSTAT, ROUTE, TRACERT, etc.), (2) a security auditing tool (e.g., FIDDLER, METASPLOIT, etc.), (3) a network port scanner (e.g., SUPERSCAN, ANGRYSCANNER, NETSCAN, SHAREENUM, etc.), (4) a network sniffer (e.g., TCP-DUMP, WIRESHARK, DSNIFF, etc.), (5) a forensics tool (e.g., ENCASE, VOLATILITY, etc.), (6) a pass-the-hash attack tool (e.g., PSHTOOLKIT, CUDAMULTIFORCER, etc.), (7) a password cracker (e.g., RAINBOW CRACKER, JOHNTHERIPPER, etc.), (8) a remote access tool (e.g., PLINK, PUTTY, REMOEXEC, etc.) (9) a file sharing tool (e.g., FTP, PSCP, WINSCP, etc.), (10) a hijacking tool (e.g., FIRESHEEP, etc.), (11) an exploitation tool (e.g., EXPLOITDB, BEEF PROJECT, etc.), and/or (12) a man in the middle attack tool (e.g., ETHERCAP, etc.).

In some examples, searching module 108 selectively assigns different risk scores to applications based on which of these subcategories searching module 108 assigns to the applications. For example, in some examples, searching module 108 may assign a risk score indicating a higher degree of risk for a password cracker, such as RAINBOW CRACKER, than another risk score indicating a lower degree of risk for a scanner, such as SUPERSCAN. In further examples, searching module 108 may assign the same risk score to some, all, or substantially all applications categorized within the same subcategory. Alternatively, searching module 108 may uniquely adjust the risk score to some, all, or substantially all applications categorized within the same subcategory based on other information known about the unique attributes of the application (e.g., one application categorized as a network sniffer may be determined to pose more of a security threat than another application that is also categorized as a network sniffer).

In one embodiment, searching module 108 is programmed to categorize the file as the hacking tool at least in part by categorizing the file into one of multiple predefined categories. Each of the predefined categories may indicate an increasing level of security threat. In one embodiment, the predefined categories include: (1) a high risk category indicating a tool that is designed for performing hacking attacks, (2) a medium risk category indicating a tool that is useful for performing hacking attacks but is not designed for performing hacking attacks, and (3) a low risk category indicating a system diagnosis tool (and/or a tool that is not substantially useful for performing hacking attacks). In other words, searching module 108 may categorize the file into one or more of two, three, four or more categories which each indicate an increasing level of security threat (e.g., three categories may indicate a low risk category, a medium risk category, and a high risk category, respectively). In some examples, searching module 108 may categorize the file into one of the predefined categories based on a previous categorization of the file into a subcategory of hacking tool, as discussed above. For example, searching module 108 may assign the high risk category indicating a tool that is designed for performing hacking attacks based on a previous categorization of the file to the subcategory indicating a password cracker, as discussed above.

In some specific examples, searching module 108 may assign all of the tools that are directly or designedly related to attacks (e.g., password crackers, hijacking tools, man in the middle attack tools, exploitation tools, and pass-the-hash attack tools) into the high risk category. Moreover, because it can be difficult to cause any harm except learning information about the compromised machine, searching module 108 may assign all of the system diagnosis tools (e.g., a predefined list including some or all of those system diagnosis tools listed above and/or equivalent tools) to the low risk category. Additionally, searching module 108 may assign all of the remaining tools (e.g., security auditing tools, IP scanners, sniffers, etc.) into the medium risk category, because these tools may be useful to an attacker to find vulnerable other machines on the network or to extract data.

In some examples, searching module 108 may search the telemetry data to match file downloads by searching a comprehensive database (e.g., database 120) that stores telemetry data for enterprise clients of a security vendor. In further examples, searching module 108 may search the comprehensive database by searching a table using at least one of the following as a database key: (1) an enterprise identifier, (2) a computing machine identifier, (3) a file hash, (4) a file name, and/or (5) a file directory. In one specific example, searching module 108 may first analyze the file previously categorized as the hacking tool to determine a file name and/or file directory for the file. Searching module 108 may then search the comprehensive database for the file name and/or file directory, thereby identifying downloads of the file by the organization over the specified period of time. Additionally, or alternatively, searching module 108 may first identify (e.g., calculate) a hash of the file previously categorized as the hacking tool. Searching module 108 may then search the comprehensive database for the hash, thereby identifying downloads of the file by the organization over the specified period of time.

In further examples, the enterprise identifier may be anonymized (e.g., the enterprise identifier, on the surface, does not reveal the identity of the enterprise but simply indicates a random or semi-random number or value that can be matched to the enterprise by someone who previously knows the correspondence between the anonymized identifier and the enterprise's identity). In these examples, searching the comprehensive database may include matching the anonymized enterprise identifier to the organization. For example, the organization may perform the searching itself (e.g., may command searching module 108 to perform the searching) by first entering or inputting the anonymized enterprise identifier that is secret and corresponds to the organization.

In additional examples, searching module 108 may search the comprehensive database by creating a sub-table from the table by removing data or fields for downloads for files other than hacking tools. Because the comprehensive database may include information describing some, all, or substantially all events involving file downloads, installation, execution, access, and/or other manipulation at organization computers over the period of time, reducing the comprehensive database to only refer to some, all, or substantially all hacking tool activity may significantly reduce the time for searching, analyzing, and/or otherwise interacting with the database.

At step 308, one or more of the systems described herein may calculate the network risk score based on the telemetry data. The network risk score may be proportional to a count of file downloads at the computers over the specified period of time that match the file previously categorized as the hacking tool. For example, calculation module 110 may, as part of server 206 in FIG. 2, calculate network risk score 212 based on the telemetry data.

As used herein, the phrase "proportional to a count of file downloads" generally indicates that the network risk score increases or decreases in linear or nonlinear proportion to the count of file downloads. For example, the network risk score may be proportional to several different counts of file downloads of different hacking tool applications, such that each different hacking tool download count only contributes a small amount to the ultimate calculation of the network risk score. Nevertheless, the network risk score may be proportional to each of the underlying download counts. Moreover, as used herein, the term "count" generally refers to a count of file downloads and/or machines that downloaded a corresponding file, as discussed further below.

Calculation module 110 may calculate the network risk score in a variety of ways. In general, calculation module 110 may calculate the network risk score based on the following factors: (1) the number and/or identities of different hacking tools downloaded at organization computers over the specified period of time, (2) the amount, severity, and/or degree of activity for each hacking tool (e.g., measured separately for each hacking tool and/or measured in aggregate for all hacking tools), and/or (3) the estimated or predefined risk level or risk score for each hacking tool downloaded over the specified period of time. In other words, calculation module 110 may calculate the network risk score based on the telemetry data at least in part by calculating a sum of sub-scores. Each sub-score may indicate a product of a risk score for a distinct hacking tool and a count of computers among organization computers that downloaded the distinct hacking tool over the specified period of time.

Notably, the summation may correspond to a summation of sub-scores for each hacking tool identified within the search or analysis of file download data for the organization over the specified period of time (e.g., some, all, and/or substantially all file downloads occurring on organization computers over the specified period of time). Similarly, the search or analysis of the file download data for the organization may search for some, all, and/or substantially all hacking tools known or previously categorized by system 200 as a hacking tool (e.g., by a security vendor, expert, software product, and/or evaluator). For example, the search or analysis may search the file download data for file downloads of any files identified within a predefined list or set of files (e.g., hacking tool list 124) known to be categorized as hacker tools.

In view of the above, calculation module 110 may calculate the network risk score according to the following formula: SUM (ApplicationActivity*ApplicationThreatLevel), such that ApplicationActivity and ApplicationThreatLevel are multiplied as a product for each hacking tool downloaded by organization computers over the period of time and then all of these products are added together. ApplicationActivity may indicate a measured level of activity for the corresponding application, such as a measured level of file download, file installation, file execution, file access, file modification, and/or other file manipulation. Similarly, ApplicationThreatLevel may indicate a measured level of security threat indicated by the application based on the knowledge that hackers previously used the application as a hacking tool. In some examples, ApplicationThreatLevel may be based all or in part on a previous categorization of the application into a subcategory of hacking tool, as discussed above. In one illustrative example, 5 machines downloaded PSHTOOLKIT that has the risk score of 10, 100 machines downloaded PING with the risk score of 1, and 30 machines downloaded WIRESHARK with the risk score of 6. The total risk score of the enterprise for that month would be 5*10+100*1+30*6=330. In other examples, one or more of the summation operations may be replaced by a multiplication operation (and vice versa).

Figure 4:
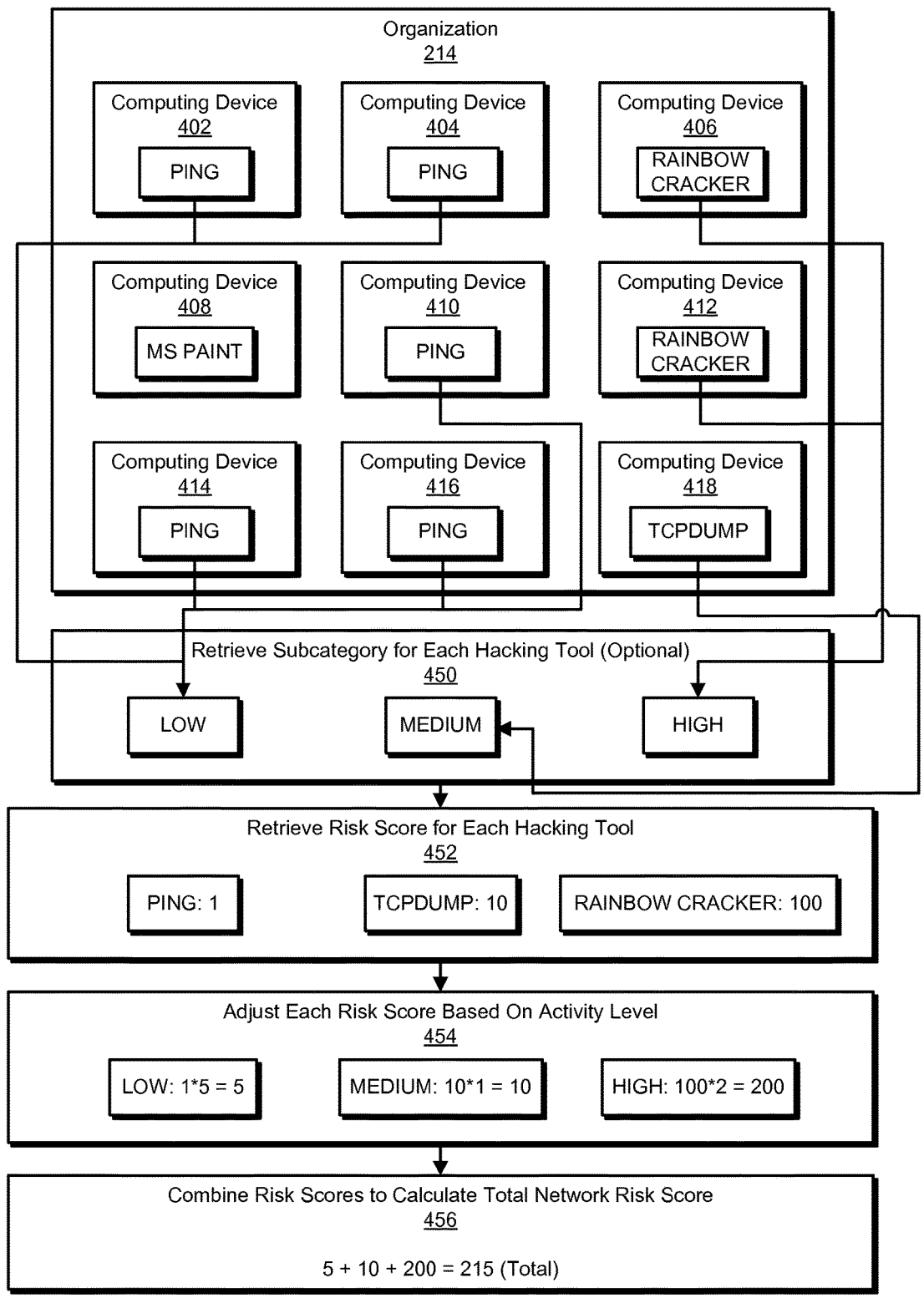
FIG. 4 is a block diagram of an exemplary workflow for calculating a network risk score.

FIG. 4 shows an exemplary workflow for calculating network risk scores that may correspond to method 300 of FIG. 3. As shown in FIG. 4, organization 214 may include multiple computing devices 402-418, which may each correspond to an instance of computing device 202. As further shown in this figure, computing device 402, computing device 404, computing device 410, computing device 414, and computing device 416 have each downloaded the PING tool, as indicated by telemetry data 122. Similarly, computing device 406 and computing device 412 have downloaded the RAINBOW CRACKER tool. Additionally, computing device 418 has downloaded the TCPDUMP tool.

Next, as further shown at step 450, searching module 108 may optionally retrieve a subcategory for each hacking tool. The subcategory may indicate a type of hacking tool (e.g., system diagnosis tools, security auditing tools, packet/IP/port/device scanners, sniffers, forensics tools, pass-the-hash attack tools, password cracking tools, remote access tools, data transmission or file sharing tools, hijacking tools, exploitation tools, and/or man-in-the-middle attack tools, as discussed above). Additionally, or alternatively, the subcategory may indicate a category or measurement of threat level (e.g., low, medium, or high threat, as further discussed above).

Next, as further shown at step 452, searching module 108 may retrieve a risk score for some or all of the hacking tools downloaded by organization computers over the specified period of time. When retrieving the risk score, searching module 108 may base, copy, and/or adjust the risk score based on one or more subcategories obtained at step 450 (e.g., a subcategory indicating a type of hacking tool and/or a subcategory indicating a degree of threat level). In this example, searching module 108 may categorize the hacking tool PING as a system diagnosis tool with a low threat level and a risk score of 1. Similarly, searching module 108 may categorize the hacking tool RAINBOW CRACKER as a password cracking tool with a high threat level and a risk score of 100. Additionally, searching module 108 may categorize the hacking tool TCPDUMP as a sniffer with a medium threat level and a risk score of 10.

Next, as further shown at step 454, searching module 108 may adjust each risk score based on the corresponding activity level. For example, searching module 108 may multiply the PING risk score (i.e., "1") by the number of computing machines that downloaded that hacking tool (i.e., "5"), thereby resulting in an adjusted risk score of 5 for PING. Searching module 108 may perform parallel adjustments for the TCPDUMP application and the RAINBOW CRACKER application, as further shown in FIG. 4. Notably, searching module 108 may additionally or alternatively calculate the activity level by measuring any other form of activity by the hacking tool, such as power consumption, processor consumption, network bandwidth consumption, installations, accesses, executions, execution duration(s), relocations, and/or modifications, etc.

Finally, as shown at step 456, searching module 108 may combine the adjusted risk scores to calculate the total or final network risk score to be reported at step 310 of method 300. In this example, searching module 108 may add the adjusted risk score for PING ("5") with the adjusted risk score for TCPDUMP ("10") and the adjusted risk score for RAINBOW CRACKER ("200") to calculate the final network risk score of 215. Instead of performing a simple summation, searching module 108 may also combine the adjusted risk scores in any other suitable manner using an algebraic formula, Boolean logic, business logic, and/or weighted formula, etc. (e.g., weighted or adjusted based on a unique attribute and/or subcategory of one or more applications). Notably, in this example, MS PAINT at computing device 408 does not constitute any type of hacking tool. Moreover, searching module 108 may count file downloads by counting individual downloads (e.g., including multiple downloads at the same computing machine) or by simply counting individual machines that performed at least one download.

Returning to FIG. 3, at step 310, one or more of the systems described herein may report the calculated network risk score that is proportional to the count of file downloads over the specified period of time that match the file previously categorized as the hacking tool. For example, reporting module 112 may report, automatically as part of server 206 in response to request 210, calculated network risk score 212 that is proportional to the count of file downloads over the specified period of time that match file 230 previously categorized as the hacking tool.

Reporting module 112 may report the calculated network risk score in a variety of ways. For example, reporting module 112 may report the network risk score through any suitable output device or mechanism, such as an audio, video, text, visual, and/or other output mechanism. In more specific examples, reporting module 112 may report the network risk score through a SHORT MESSAGE SERVICE message, an application notification (e.g., pop-up notification), a printed report, an audio alert, a telephone message, an email, a graphical user interface window, a command line output, and/or any other suitable output mechanism. Reporting module 112 may also report additional contextual information about the downloaded hacking tools, including the numbers, locations, identities, hacking tool subcategories, and/or risk scores for these hacking tools, as well as the machines and/or users that downloaded the hacking tools.

Additionally, network administrators and/or automated security software may take one or more remedial actions in response to receiving the report of the calculated network risk score from reporting module 112. For example, autonomous or semiautonomous security software, including reporting module 112, may enable, trigger, and/or enhance one or more security measures, such as virus scanning levels, security profile levels, firewall levels, encryption levels, password turnover, and/or password compliance standards, etc. Autonomous or semiautonomous security software may also diminish access to one or more hacking tools, such as reducing or restricting installation, execution, access, and/or modification of the hacking tool, quarantining or sandboxing the hacking tool, triggering monitoring, logging, and/or reporting of activity by the hacking tool, and/or deleting, uninstalling, and/or disabling the hacking tool. Additionally, reporting module 112 may also compare the calculated network risk score with one or more predefined thresholds. Satisfaction of the predefined threshold may indicate that the organization's network is under attack (or is a candidate for attack) and/or that the organization's network indicates a level of vulnerability to attack, which reporting module 112 may report to the organization accordingly.

As explained above in connection with method 300 in FIG. 3, the disclosed systems and methods may provide enterprise organizations with additional insights on potential network security risks and vulnerabilities. Specifically, the disclosed systems and methods may provide enterprise organizations with insights about hacker tool activity on computing machines owned or managed by the enterprise organizations, as discussed above. Accordingly, enterprise organizations may benefit from an improved understanding of which computing machines and/or how many computing machines have installed, downloaded, accessed, executed, and/or otherwise interacted with hacking tools over a specified period of time.

Figure 5:
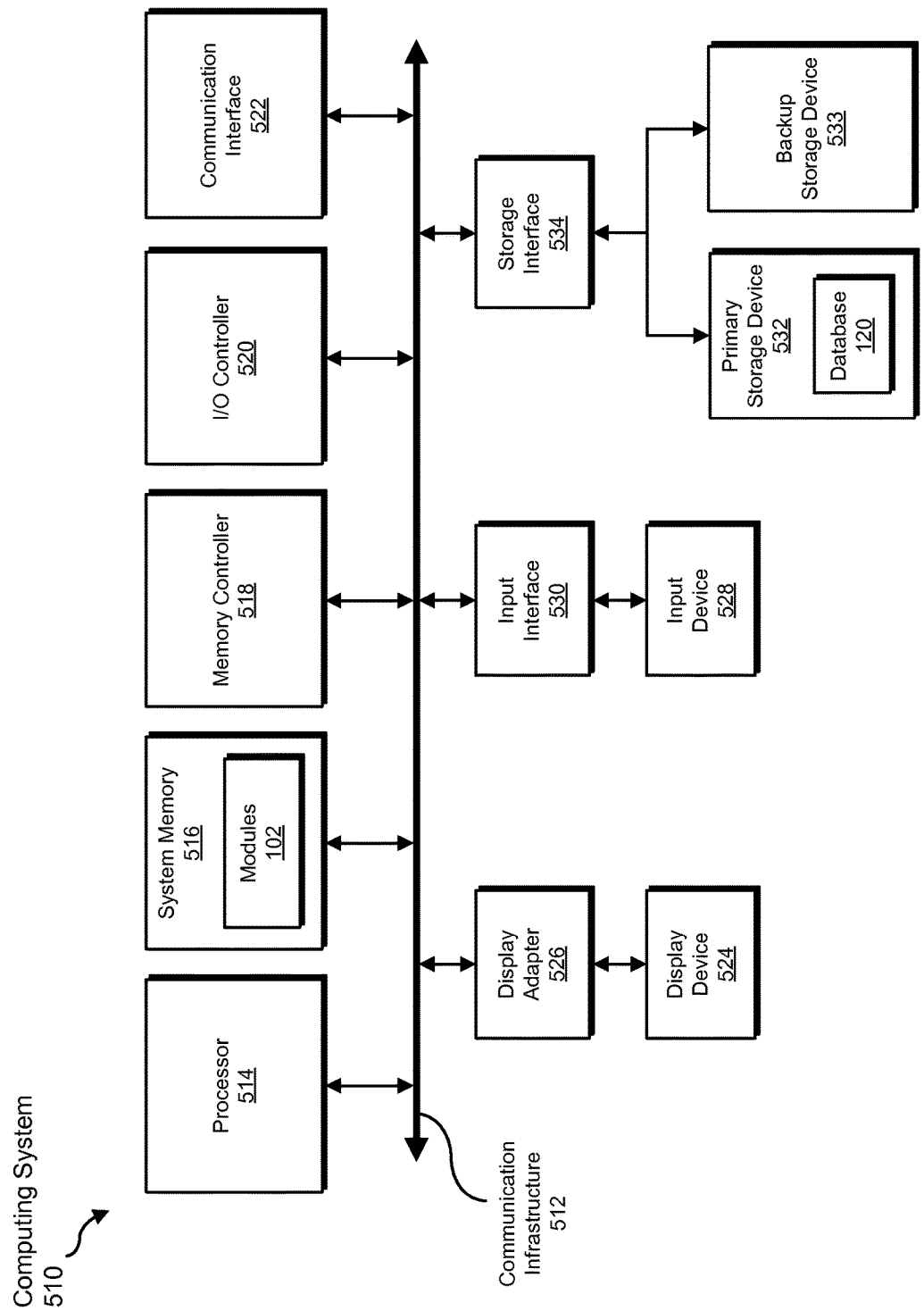
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
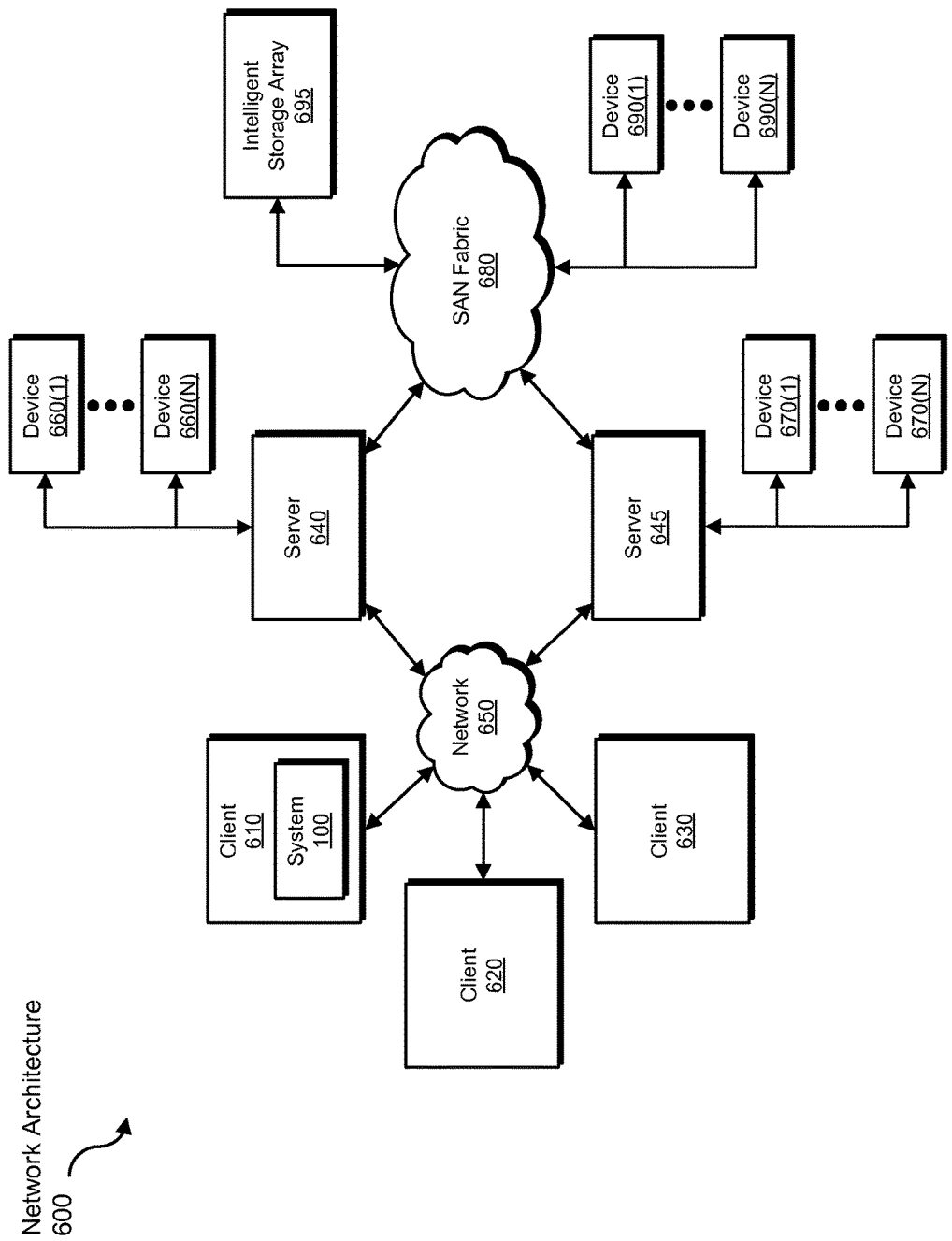
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for evaluating network security.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to calculate a network risk score, transform the request and/or associated configuration metadata by calculating the network risk score (e.g., transform inputs to outputs), output a result of the transformation to a display or other output device, use the result of the transformation to help protect enterprise organizations from malicious attacks by hackers, and store the result of the transformation to a disk or other memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating network security, at least a portion of the method being performed by a computing device comprising at least one processor, the method comprising:

receiving, by a security server, a request to report a network risk score for an organization based on telemetry data describing file downloads at a plurality of computers managed by the organization over a specified period of time;

identifying the telemetry data describing file downloads at the plurality of computers managed by the organization over the specified period of time;

searching the telemetry data to match file downloads over the specified period of time to at least one file that was previously categorized, prior to the request, as a hacking tool;

calculating the network risk score based on the telemetry data, the network risk score being proportional to a count of file downloads at the plurality of computers over the specified period of time that match the file previously categorized as the hacking tool;

reporting, automatically by the security server in response to the request, the calculated network risk score that is proportional to the count of file downloads over the specified period of time that match the file previously categorized as the hacking tool; and performing a remedial action in response to receiving the report of the calculated network risk score, the remedial action comprising at least one of:
triggering a virus scan; and
diminishing access to the hacking tool.

2. The method of claim 1, wherein the security server categorized the file as the hacking tool at least in part by:
creating a comprehensive list of hacking tools identified within a data set; and
identifying the file on the comprehensive list of hacking tools.

3. The method of claim 1, wherein the security server categorized the file as the hacking tool at least in part by categorizing the file as at least one of:
a system diagnosis tool;
a security auditing tool;
a network port scanner;
a network sniffer;
a forensics tool;
a pass-the-hash attack tool;
a password cracker;
a remote access tool;

a file sharing tool;
a hijacking tool;
an exploitation tool; and
a man in the middle attack tool.

4. The method of claim 1, wherein the security server categorized the file as the hacking tool at least in part by categorizing the file into one of a plurality of predefined categories, each of the predefined categories indicating an increasing level of security threat.

5. The method of claim 4, wherein the predefined categories comprise:
a high risk category indicating a tool that is designed for performing hacking attacks;
a medium risk category indicating a tool that is useful for performing hacking attacks but is not designed for performing hacking attacks; and
a low risk category indicating a system diagnosis tool.

6. The method of claim 1, wherein searching the telemetry data to match file downloads comprises searching a comprehensive database that stores telemetry data for a plurality of enterprise clients of a security vendor.

7. The method of claim 6, wherein searching the comprehensive database comprises searching a table using at least one of the following as a database key:
an enterprise identifier;
a computing machine identifier;
a file hash;
a file name; and
a file directory.

8. The method of claim 7, wherein searching the comprehensive database comprises creating a sub-table from the table by removing downloads for files other than hacking tools.

9. The method of claim 7, wherein:
the enterprise identifier is anonymized; and
searching the comprehensive database comprises matching the anonymized enterprise identifier to the organization.

10. The method of claim 1, wherein calculating the network risk score based on the telemetry data comprises calculating a sum of sub-scores, each sub-score indicating a product of a risk score for a distinct hacking tool and a count of computers in the plurality of computers that downloaded the distinct hacking tool over the specified period of time.

11. A system for evaluating network security, the system comprising:
a reception module, stored in memory, that receives, as part of a security server, a request to report a network risk score for an organization based on telemetry data describing file downloads at a plurality of computers managed by the organization over a specified period of time;
an identification module, stored in memory, that identifies the telemetry data describing file downloads at the plurality of computers managed by the organization over the specified period of time;
a searching module, stored in memory, that searches the telemetry data to match file downloads over the specified period of time to at least one file that was previously categorized, prior to the request, as a hacking tool;
a calculation module, stored in memory, that calculates the network risk score based on the telemetry data, the network risk score being proportional to a count of file downloads at the plurality of computers over the specified period of time that match the file previously categorized as the hacking tool;
a reporting module, stored in memory, that:
reports, automatically as part of the security server in response to the request, the calculated network risk score that is proportional to the count of file downloads over the specified period of time that match the file previously categorized as the hacking tool; and
performs a remedial action comprising at least one of:
triggering a virus scan; and
diminishing access to the hacking tool; and
at least one physical processor configured to execute the reception module, the identification module, the searching module, the calculation module, and the reporting module.

12. The system of claim 11, wherein the searching module is programmed to categorize the file as the hacking tool at least in part by:
creating a comprehensive list of hacking tools identified within a data set; and
identifying the file on the comprehensive list of hacking tools.

13. The system of claim 11, wherein the searching module is programmed to categorize the file as the hacking tool at least in part by categorizing the file as at least one of:
a system diagnosis tool;
a security auditing tool;
a network port scanner;
a network sniffer;
a forensics tool;
a pass-the-hash attack tool;
a password cracker;
a remote access tool;
a file sharing tool;
a hijacking tool;
an exploitation tool; and
a man in the middle attack tool.

14. The system of claim 11, wherein the searching module is programmed to categorize the file as the hacking tool at least in part by categorizing the file into one of a plurality of predefined categories, each of the predefined categories indicating an increasing level of security threat.

15. The system of claim 14, wherein the predefined categories comprise:
a high risk category indicating a tool that is designed for performing hacking attacks;
a medium risk category indicating a tool that is useful for performing hacking attacks but is not designed for performing hacking attacks; and
a low risk category indicating a system diagnosis tool.

16. The system of claim 11, wherein the searching module searches the telemetry data to match file downloads by searching a comprehensive database that stores telemetry data for a plurality of enterprise clients of a security vendor.

17. The system of claim 16, wherein the searching module searches the comprehensive database by searching a table using at least one of the following as a database key:
an enterprise identifier;
a computing machine identifier;
a file hash;
a file name; and
a file directory.

18. The system of claim 17, wherein the searching module searches the comprehensive database by creating a sub-table from the table by removing downloads for files other than hacking tools.

19. The system of claim 17, wherein:
the enterprise identifier is anonymized; and the searching module searches the comprehensive database at least in part by matching the anonymized enterprise identifier to the organization.

20. A non-transitory computer-readable medium comprising one or more computer-readable instructions that, when executed by at least one processor of a computing device, cause the computing device to:

receive, by a security server, a request to report a network risk score for an organization based on telemetry data describing file downloads at a plurality of computers managed by the organization over a specified period of time;

identify the telemetry data describing file downloads at the plurality of computers managed by the organization over the specified period of time;

search the telemetry data to match file downloads over the specified period of time to at least one file that was previously categorized, prior to the request, as a hacking tool;

calculate the network risk score based on the telemetry data, the network risk score being proportional to a count of file downloads at the plurality of computers over the specified period of time that match the file previously categorized as the hacking tool;

report, automatically by the security server in response to the request, the calculated network risk score that is proportional to the count of file downloads over the specified period of time that match the file previously categorized as the hacking tool; and perform a remedial action in response to receiving the report of the calculated network risk score, the remedial action comprising at least one of:

triggering a virus scan; and diminishing access to the hacking tool.

* * * * *